United States Patent
Kim et al.

(10) Patent No.: US 10,160,825 B2
(45) Date of Patent: Dec. 25, 2018

(54) POLYURETHANE ELASTOMER, THERMOPLASTIC RESIN COMPOSITION COMPRISING THE POLYURETHANE ELASTOMER, MOLDED ARTICLE MADE OF THE THERMOPLASTIC RESIN COMPOSITION, AND METHOD OF PREPARING THE POLYURETHANE ELASTOMER

(71) Applicant: Samsung Electronics Co., Ltd., Suwon-si, Gyeonggi-do (KR)

(72) Inventors: Inki Kim, Hwaseong-si (KR); Kyunghae Lee, Incheon (KR); Mooho Lee, Suwon-si (KR); Kwangmyung Cho, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 238 days.

(21) Appl. No.: 14/918,852

(22) Filed: Oct. 21, 2015

(65) Prior Publication Data

US 2016/0108167 A1  Apr. 21, 2016

(30) Foreign Application Priority Data

Oct. 21, 2014 (KR) ........................ 10-2014-0142772

(51) Int. Cl.

| | | |
|---|---|---|
| *C08G 18/73* | (2006.01) | |
| *C08G 18/32* | (2006.01) | |
| *C08J 5/00* | (2006.01) | |
| *C08G 18/38* | (2006.01) | |
| *C08L 67/04* | (2006.01) | |
| *C08L 75/04* | (2006.01) | |
| *C08G 18/34* | (2006.01) | |
| *C08G 18/60* | (2006.01) | |
| *C08G 18/76* | (2006.01) | |

(52) U.S. Cl.
CPC ......... *C08G 18/73* (2013.01); *C08G 18/3206* (2013.01); *C08G 18/34* (2013.01); *C08G 18/3844* (2013.01); *C08G 18/603* (2013.01); *C08G 18/606* (2013.01); *C08G 18/7621* (2013.01); *C08G 18/7671* (2013.01); *C08J 5/00* (2013.01); *C08L 67/04* (2013.01); *C08L 75/04* (2013.01); *C08G 2261/126* (2013.01); *C08J 2367/04* (2013.01); *C08J 2375/04* (2013.01); *C08J 2467/04* (2013.01); *C08J 2475/04* (2013.01); *C08L 2207/04* (2013.01)

(58) Field of Classification Search
CPC ................................................ C08G 18/6541
See application file for complete search history.

(56) References Cited

U.S. PATENT DOCUMENTS

| | | | |
|---|---|---|---|
| 4,555,550 A * | 11/1985 | Droescher | ............ C08G 18/606 524/101 |
| 5,053,316 A * | 10/1991 | Suzuki | .................... G03F 7/037 430/281.1 |
| 5,247,058 A | 9/1993 | Gruber et al. | |
| 5,521,278 A | 5/1996 | Obrien et al. | |
| 5,675,021 A | 10/1997 | Eggeman et al. | |
| 6,326,458 B1 | 12/2001 | Gruber et al. | |
| 7,700,332 B1 | 4/2010 | Rajgarhia et al. | |
| 8,137,953 B2 | 3/2012 | Miller et al. | |
| 2004/0127673 A1* | 7/2004 | Sunkara | ................. C08G 18/10 528/61 |
| 2009/0053782 A1 | 2/2009 | Dundon et al. | |
| 2011/0039316 A1 | 2/2011 | Onishi et al. | |
| 2011/0053231 A1 | 3/2011 | Sasaki et al. | |
| 2011/0263811 A1 | 10/2011 | Sawai et al. | |
| 2012/0040185 A1* | 2/2012 | Topolkaraev | ........... D01F 6/625 428/401 |
| 2013/0210983 A1* | 8/2013 | Topolkaraev | ....... C08L 23/0807 524/265 |
| 2014/0194533 A1 | 7/2014 | Hsu et al. | |
| 2014/0206085 A1 | 7/2014 | Kim et al. | |
| 2014/0220647 A1 | 8/2014 | Kim et al. | |
| 2015/0024444 A1 | 1/2015 | Lee et al. | |
| 2015/0044740 A1 | 2/2015 | Kim et al. | |
| 2015/0064752 A1 | 3/2015 | Lee et al. | |
| 2015/0087032 A1 | 3/2015 | Park et al. | |
| 2015/0140625 A1 | 5/2015 | Lee et al. | |
| 2015/0140626 A1 | 5/2015 | Song et al. | |
| 2015/0152447 A1 | 6/2015 | Kim et al. | |
| 2015/0159183 A1 | 6/2015 | Park et al. | |

(Continued)

FOREIGN PATENT DOCUMENTS

| | | |
|---|---|---|
| CN | 101392094 A | 3/2009 |
| CN | 102391628 B | 9/2011 |

(Continued)

OTHER PUBLICATIONS

Cohn et al., "Designing biodegradable multiblock PCL/PLA thermoplastic", *Biomaterials*, 26: 2297-2305 (2005).
Feng et al., "Morphologies and Mechanical Properties of Polylactide/Thermoplastic Polyurethane Elastomer Blends", *Journal of Applied Polymer Science*, 119: 2778-2783 (2011).
Han et al., "Preparation and Characterization of Biodegradable Polylactide/Thermoplastic Polyurethane Elastomer Blends", *Journal of Applied Polymer Science*, 120: 3217-3223 (2011).
Jaso et al., "Bio-Plastics and Elastomers from Polylactic Acid/Thermoplastic Polyurethane Blends", *Journal of Applied Polymer Science*, DOI: 10.1002, APP. 41104, pp. 1-8 (2014).

(Continued)

*Primary Examiner* — Christopher M Rodd
(74) *Attorney, Agent, or Firm* — Leydig, Voit & Mayer, Ltd.

(57) ABSTRACT

A polyurethane elastomer including a polymerization product of an amide group-including compound, a polyol compound, a polybasic acid compound, and a diisocyanate compound, a thermoplastic resin composition including the polyurethane elastomer, a molded article made of the thermoplastic resin composition, and a method of preparing the polyurethane elastomer.

16 Claims, No Drawings

(56) References Cited

U.S. PATENT DOCUMENTS

| | | |
|---|---|---|
| 2015/0167031 A1 | 6/2015 | Kim et al. |
| 2015/0191412 A1 | 7/2015 | Kang et al. |
| 2015/0225501 A1 | 8/2015 | Lee et al. |
| 2015/0225752 A1 | 8/2015 | Lim et al. |
| 2015/0232894 A1 | 8/2015 | Kim et al. |

FOREIGN PATENT DOCUMENTS

| | | |
|---|---|---|
| EP | 0 143 953 A2 | 6/1985 |
| EP | 0 348 063 A1 | 12/1989 |
| FR | 2 344 583 A1 | 10/1997 |
| JP | H11 116657 A | 4/1999 |
| JP | 2 938522 B2 | 8/1999 |
| JP | 3 615602 B2 | 2/2005 |
| JP | 2005-320409 A | 11/2005 |
| JP | 2008-266454 A | 11/2008 |
| JP | 2008-297333 A | 12/2008 |
| JP | 2011 213867 A | 10/2011 |
| KR | 2009-0072832 A | 7/2009 |
| KR | 2013-0139691 A | 12/2013 |

OTHER PUBLICATIONS

Li et al., "Toughening of Polylactide by Melt Blending with a Biodegradable Poly(ether)urethane Elastomer", *Macromolecular Bioscience*, 7: 921-928 (2007).

Zhang et al., "Surprising shape-memory effect of polylactide resulted from toughening by polyamide elastomer", *Polymer*, 50: 1311-1315 (2009).

Extended European Search Reported issued in 15190691.4-1302 dated Mar. 1, 2016.

\* cited by examiner

POLYURETHANE ELASTOMER, THERMOPLASTIC RESIN COMPOSITION COMPRISING THE POLYURETHANE ELASTOMER, MOLDED ARTICLE MADE OF THE THERMOPLASTIC RESIN COMPOSITION, AND METHOD OF PREPARING THE POLYURETHANE ELASTOMER

RELATED APPLICATIONS

This application claims the benefit of Korean Patent Application No. 10-2014-0142772, filed on Oct. 21, 2014, in the Korean Intellectual Property Office, the entire disclosure of which is hereby incorporated by reference.

BACKGROUND

1. Field

The present disclosure relates to a polyurethane elastomer, a thermoplastic resin composition including the polyurethane elastomer, a molded article made of the thermoplastic resin composition, and a method of preparing the polyurethane elastomer.

2. Description of the Related Art

There is an increasing concern about biodegradable resins such as aliphatic polyester in the aspect of environmental protection. Polylactic acid (or polylactide) is a biodegradable resin having a melting point of about 130° C. to 180° C. and good transparency. Lactic acid as a source material of polylactic acid is available from renewable sources such as plants.

Polylactic acid has low impact strength and poor durability, so it may be easily broken by an external impact. Polylactic acid may be mixed with other thermoplastic elastomers to have improved durability. For example, conventional thermoplastic elastomers such as polyamide elastomer, polyurethane elastomer, or the like may be mixed with polylactic acid.

Mixing polylactic acid with such a conventional thermoplastic elastomer may improve some physical characteristics such as impact strength of polylactic acid, but not satisfactorily.

Therefore, there is a need for a method of further improving physical characteristics such as impact strength of polylactic acid.

SUMMARY

Provided is a polyurethane elastomer comprising an amide compound, a polyol compound, a polybasic acid compound, and a diisocyanate compound Provided is a thermoplastic resin composition including the polyurethane elastomer.

Provided is a molded article made of the thermoplastic resin composition.

Provided is a method of preparing a polyurethane elastomer, the method comprising: polymerizing a polyamide-forming composition comprising an amide group-including compound, a polyol compound, and a polybasic acid compound to obtain a polyamide prepolymer; and polymerizing the polyamide prepolymer with a diisocyanate compound to obtain the polyurethane elastomer.

Additional compositions and methods also are provided.

DETAILED DESCRIPTION

Additional aspects will be set forth in part in the description which follows and, in part, will be apparent from the description, or may be learned by practice of the presented embodiments.

Reference will now be made in detail to embodiments of a polyurethane elastomer, a thermoplastic resin composition including the polyurethane elastomer, a molded article made of the thermoplastic resin composition, and a method of preparing the polyurethane elastomer. The present embodiments may have different forms and should not be construed as being limited to the descriptions set forth herein. Accordingly, the embodiments are merely described below, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

As used herein, the term "comprising", "comprise," "include," "includes," "including", or "containing" refers to including target components or ingredients without limitations in any embodiments, not excluding additional components or ingredients.

As used herein, "lactide" may include L-lactide consisting of L-lactic acid, D-lactide consisting of D-lactic acid, and meso-lactide consisting of L-lactic acid and D-lactic acid.

As used herein, "polylactic acid" refers to any polymer including a repeating unit formed by ring opening polymerization of lactide monomers or direct polymerization of lactic acid, for example, a single polymer or a copolymer, and is not limited to specific forms of polymers. For example, "polylactic acid" may include any of a variety of polymers in any forms, including a polymer unpurified or purified after ring opening polymerization, a polymer in a liquid or solid resin composition before molding into a molded article, or a polymer in a molded plastic, film, or textile.

As used herein, the term "amide group-including compound" or "amide compound" refers to a single molecular compound including an amide group (—C(=O)—NH—) in a molecule, or a polymerization product including an amide group.

As used herein, the term "polyol compound" refers to a compound including at least two hydroxyl groups (—OH) in a molecule. A polyol compound may be an oligomer or a polymer.

As used herein, the term "polybasic acid compound" refers to a single molecular compound including at least two carboxyl groups (—COOH) in a molecule.

As used herein, the term "diisocyanate compound" refers to a single molecular compound including two isocyanate groups (—N=C=O) in a molecule.

As used herein, a "block copolymer" may include at least two homopolymer segments linked by a covalent bond or a junction block.

As used herein, the term "junction block" refers to one or more monomers that link the segments of a block copolymer together.

As used herein, the term "elastomer" refers to a polymer and/or a physical mixture of at least two polymers, having viscoelasticity and weak intermolecular forces.

As used herein, the term "thermoplastic elastomer" refers to a copolymer and/or a physical mixture of at least two polymers, having thermoplasticity and viscoelasticity. The thermoplastic elastomer may be an elastomer that increases in flexibility with increasing temperature. The thermoplastic elastomer may be a non-cross-linked elastomer. A cross-linked elastomer may be thermosetting.

As used herein, the term "polyurethane elastomer" refers to an elastomer including a urethane structural unit that is the result of a reaction between a polyol compound and a diisocyanate compound.

As used herein, the term "prepolymer" refers to a material prepared by a reaction of one or more monomers, i.e., refers to a monomer or system of monomers that have been reacted to an intermediate molecular mass state. This material may be subjected to further polymerization by reactive groups.

According to an aspect of the present disclosure, a polyurethane elastomer includes an amide group-including compound, a polyol compound, a polybasic acid compound, and a diisocyanate compound.

The polyurethane elastomer has a novel structure including both a structural unit from the amide group-including compound and a structural unit from the diisocyanate compound. The polyurethane elastomer may be mixed with polylactic acid to further improve physical characteristics such as the impact strength, of the polylactic acid.

The polyurethane elastomer may be a block copolymer including at least one hard segment polymer block and at least one soft segment polymer block. The block copolymer may have a structure in which the hard segment block and the soft segment block are linked to each other in series via a single bond. A conjunction block may be included between the hard segment block and the soft segment block to connect them.

The ratio of the hard segment block to the soft segment block may be in a range of about 10:90 by wt % to about 90:10 by wt %. For example, the ratio of the hard segment block to the soft segment block may be in a range of about 20:80 by wt % to about 80:20 by wt %, and in some embodiments, about 30:70 by wt % to about 70:30 by wt %, and in some other embodiments, about 40:60 by wt % to about 60:40 by wt %.

The hard segment block of the block copolymer may include at least one first block including a structural unit from the amide group-including compound and at least one second block including a structural unit from the diisocyanate compound. Due to the inclusion of the first and second blocks each including different structural units, the polyurethane elastomer may have improved compatibility with polylactic acid compared with that of conventional polyurethane elastomers, and may remarkably improve the impact strength of a thermoplastic resin composition including the polylactic acid. The first block and/or second block of the hard segment block may improve miscibility and crystallinity of a thermoplastic resin composition through hydrogen bonding with polylactic acid.

A ratio of the first block to the second block in the hard segment block may be in a range of about 50:50 by wt % to about 99.5:0.5 by wt %. For example, the ratio of the first block to the second block in the hard segment block may be in a range of about 80:20 by wt % to about 99.5:0.5 by wt %, and in some embodiments, about 90:10 by wt % to about 99.5:0.5 by wt %, and in some other embodiments, about 95:5 by wt % to about 99:1 by wt %.

The soft segment block of the block copolymer may include a structural unit from the polyol compound. The soft segment block may connect the first block and the second block of the hard segment block by a single bond. For example, the block copolymer may have a structure in which a first block, a soft segment block, a second block, and a soft segment block are sequentially connected to one other. For example, at least one conjunction block may be included between these blocks. For example, a structural unit from the polybasic acid (or polyfunctional acid) compound may form a conjunction block. The soft segment block is miscible with polylactic acid, and thus may improve the miscibility of the polyurethane elastomer with polylactic acid.

The amide group-including compound may include at least one selected from a linear amide compound and a cyclic amide compound.

For example, the linear amide compound may have a structure represented by Formula 1.

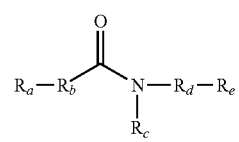

<Formula 1>

In Formula 1: $R_a$ may be a hydrogen, a halogen, a C1-C10 alkyl group (e.g., C1-C6 alkyl group), or a carboxyl group;

$R_b$ and $R_d$ may be each independently a C1-C10 alkylene group (e.g., C1-C6 alkylene group);

$R_c$ may be a hydrogen or a C1-C10 alkyl group (e.g., C1-C6 alkyl group); and $R_e$ may be a hydrogen or an amine group.

For example, the linear amide compound may be a reaction product of dicarboxylic acid and diamine. For example, the linear amide compound may be a reaction product of adipic acid and hexamethylenediamine.

For example, the cyclic amide compound may have a structure represented by Formula 2.

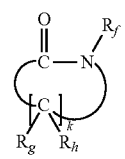

<Formula 2>

In Formula 2: $R_f$ may be a hydrogen or a C1-C10 alkyl group (e.g., C1-C6 alkyl group);

$R_g$ and $R_h$ may be each independently a C1-C10 alkyl group (e.g., C1-C6 alkyl group), a C6-C20 aryl group (e.g., C6-C10 aryl group), a C6-C10 cycloalkyl group, a C2-C10 alkenyl group (e.g., C2-C6 alkenyl group), or a C2-C10 alkynyl group (e.g., C2-C6 alkynyl group); and k may be an integer of 2 to 20, such as 2 to 10 or 2 to 6 (e.g., 2, 3, 4, 5, 6, 7, 8, 9, 10, etc.).

The cyclic amide group-including compound may be, for instance, a C3-C20 lactam (e.g., a C3-C10 lactam). For example, the cyclic amide group-including compound may be propiolactam, butyrolactam, valerolactam, or caprolactam.

Non-limiting examples of the amide group-including compound are Nylon-6, Nylon-6,6, Nylon-6,9, Nylon-6,10, Nylon-6,12, Nylon-10, Nylon-12, and Nylon-4,6. Any suitable amide group-including compound available to prepare polyamide in the art may be used.

The polyol compound may include at least one compound selected from a polyether polyol compound, a polyester polyol compound, and a polycarbonate polyol compound.

For example, the polyether polyol compound may be a polymerization product of cyclic ether such as ethylene oxide, propylene oxide, or tetrahydrofuran, for example, polyethylene glycol (PEG), polypropylene glycol (PPG), polytetramethylene glycol (PTMG), or a copolymer thereof resulting from polymerization of ethylene oxide, propylene oxide, or tetrahydrofuran.

For example, the polyether polyol compound may be a compound represented by Formula 3:

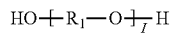

<Formula 3>

In Formula 3, $R_1$ may be a C2-C10 (e.g., C2-C8 or C2-C6) branched or linear alkylene group; and "l" may be integer of 10 to 100. For example, the polyether polyol compound may have a molecular weight of about 100 Daltons to about 150,000 Daltons, and in some embodiments, about 100 Daltons to about 10,000 Daltons, and in some other embodiments, about 1,000 Daltons to about 10,000 Daltons, and in still other embodiments, about 1,000 Daltons to about 4,000 Daltons. As a result of gel permeation chromatography (GPC) analysis, a molecular weight of the polyol compound can be determined. The GPC analysis can be performed using polystyrene as a standard and tetrahydrofuran as a solvent.

For example, the polyester polyol compound may be a condensation product of a dicarboxylic acid compound or an acid anhydride with a diol, or may be, for example, a polylactone diol resulting from ring opening polymerization of a lactone compound. However, the polyester polyol compound is not limited thereto and may be any polyester polyol compounds available in the art. Non-limiting examples of the diol are ethylene glycol, 1,3-propylene glycol, 1,2-propyleneglycol, 1,3-butanediol, 1,5-pentanediol, 1,6-hexanediol, 3-methyl-1,5-pentanediol, neopentyl glycol, 1,8-octanediol, and 1,9-nonanediol.

For example, the polycarbonate polyol compound may be a reaction product of one or at least two polyalcohols such as ethylene glycol, 1,3-propylene glycol, 1,2-propyleneglycol, 1,3-butanediol, 1,5-pentanediol, 1,6-hexanediol, 3-methyl-1,5-pentanediol, neopentyl glycol, 1,8-octanediol, 1,9-nonanediol, and diethylene glycol, with dimethyl carbonate, or the like, but is not limited thereto. The polycarbonate polyol compound is not limited thereto, and may be any polycarbonate polyol compound available in the art.

For example, the polyol compound may be a polyethyleneglycol having a molecular weight of about 1,000 Daltons to about 4,000 Daltons.

The polybasic acid compound may be a dicarboxylic acid compound. For example, (the polybasic acid compound may be at least one selected from aliphatic dicarboxylic acid, aromatic dicarboxylic acid, alicyclic dicarboxylic acid, and an acid anhydride thereof.

The aliphatic dicarboxylic acid may be a compound represented by Formula 4.

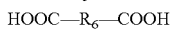

<Formula 4>

In Formula 4, $R_6$ may be a covalent bond or a C1-C20 linear or branched alkylene group. For example, $R_6$ in Formula 1 may be a C1-C15 linear alkylene group, and in some embodiments, a C1-C10 linear alkylene group, and in some other embodiments, a C1-C6 linear alkylene group.

The aromatic dicarboxylic acid may be a compound represented by Formula 5 and/or an anhydride of these dicarboxylic acids.

<Formula 5>

In Formula 5, $Ar_1$ may be a C6-C20 arylene group or a C2-C20 heteroarylene group; and $A_1$ and $A_2$ may be each independently a covalent bond or a C1-C5 linear or branched alkylene group. For example, $Ar_1$ may be a phenylene group, a naphthalene group, or a pyridinylene group. At least one hydrogen of the arylene group and the heteroarylene group may be substituted with a halogen or a C1-C10 (e.g., C1-C6) linear or branched alkyl group.

The alicyclic dicarboxylic acid may be a compound represented by Formula 6 and/or an anhydride of these dicarboxylic acids.

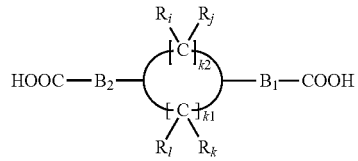

<Formula 6>

In Formula 6, $R_i$, $R_j$, $R_k$, and $R_l$ may be each independently a hydrogen, a C1-C10 alkyl group, a C6-C20 aryl group, a C6-C10 cycloalkyl group, a C2-C10 alkenyl group, or a C2-C10 alkynyl group; $B_1$ and $B_2$ may be each independently a covalent bond or a C1-C5 alkylene group; and k1 and k2 may be each independently an integer of 1 to 20. For example, the polybasic acid compound may be at least one selected from oxalic acid, malonic acid, succinic acid, glutaric acid, adipic acid, pimelic acid, suberic acid, azelaic acid, sebasic acid, phthalic acid, isophthalic acid, terephthalic acid, hexahydrophthalic acid, and hexahydroisophthalic acid.

The diisocyanate compound may be at least one selected from an aliphatic diisocyanate compound, an aromatic diisocyanate compound, and an alicyclic diisocyanate compound.

The aliphatic diisocyanate compound may be a compound represented by Formula 7.

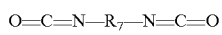

<Formula 7>

In Formula 7, $R_7$ may be a covalent bond or a C1-C20 linear or branched alkylene group. For example, $R_7$ in Formula 7 may be a C1-C15 linear alkylene group. For example, $R_7$ in Formula 7 may be a C1-C10 linear alkylene group, and in some embodiments, may be a C1-C6 linear alkylene group. At least one hydrogen of the alkylene group may be substituted with a C1-C10 alkyl group or a C6-C20 aryl group.

The aromatic diisocyanate compound may be a compound represented by Formula 8.

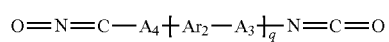

<Formula 8>

In Formula 8, $Ar_1$ may be a C6-C20 arylene group or a C2-C20 heteroarylene group; $A_3$ and $A_4$ may be each independently a covalent bond or a C1-C5 linear or branched alkylene group; and q may be an integer of 1 to 3. For example, $Ar_1$ in Formula 8 may be a phenylene group, a naphthalene group, or a pyridinylene group. At least one hydrogen of the arylene group and the heteroarylene group may be substituted with a halogen or a C1-C10 linear or branched alkyl group.

The alicyclic diisocyanate compound may be a compound represented by Formula 9.

<Formula 9>

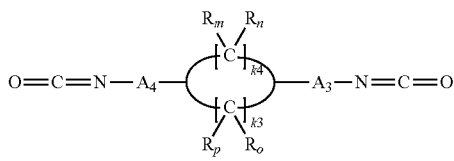

In Formula 9, $R_m$, $R_n$, $R_o$, and $R_p$ may be each independently a hydrogen, a C1-C10 alkyl group, a C6-C20 aryl group, a C6-C10 cycloalkyl group, a C2-C10 alkenyl group, or a C2-C10 alkynyl group; $A_3$ and $A_4$ may be each independently a covalent bond or a C1-C5 linear or branched alkylene group; and k3 and k4 may be each independently an integer of 1 to 20.

For example, the diisocyanate compound for the polyurethane elastomer may be at least one selected from toluene diisocyanate (TDI), 4,4-methylenediphenyldiisocyanate (MDI), 1,5-naphthalene diisocyanate (NDI), 1,6-hexamethylene diisocyanate (HMDI), isophorone diisocyanate (IPDI), xylene diisocyanate (XDI), tetramethylxylene diisocyanate (TMXDI), and 1,8-diisocyanate methyloctane.

For example, the polyurethane elastomer may include a structural unit represented by Formulae 10 to 12, and at least one of structural units represented by Formulae 13a to 13c:

—(—$R_1$—O—)—  <Formula 10>

—(—CO—$R_2$—NH—)—  <Formula 11>

—(—OC—NH—$R_4$—NH—CO—)—  <Formula 12>

—(—OOC—$R_3$—COO—)—  <Formula 13a>

—(—OOC—$R_3$—CO—)—  <Formula 13b>

—(—OC—$R_3$—CO—)—  <Formula 13c>

In Formulae 10 to 12 and Formulae 13a to 13c: $R_1$ and $R_2$ may be each independently a C2-C10 linear or branched alkylene group; and $R_3$ and $R_4$ may be each independently a covalent bond, a C1-C20 linear or branched alkylene group that is unsubstituted or substituted with a C1-C10 alkyl group or a C6-C20 aryl group, a C6-C20 arylene group or C2-C20 heteroarylene group that is unsubstituted or substituted with a halogen or a C1-C10 linear or branched alkyl group, or a C2-C20 cycloalkylene group that is unsubstituted or substituted with a C1-C10 alkyl group, a C6-C20 aryl group, a C6-C10 cycloalkyl group, a C2-C10 alkenyl group, or a C2-C10 alkynyl group, wherein a mole fraction a of the structural unit (i.e., the fraction or percent of the moles of a structural unit that is present in the total moles of the polyurethane elastomer) represented by Formula 10, a mole fraction b of the structural unit represented by Formula 11, a mole fraction c of the structural formula of Formula 12, and mole fractions d1, d2, and d3 of the structural units represented by Formulae 13a to 13c, respectively, may satisfy the following relationship: a+b+c+d=1 and d=d1+d2+d3, where 0<a<1, 0<b<1, 0<c<1, 0<d<1, 0≤d1<1, 0≤d2<1, and 0≤d3<1, where d is a sum of d1, d2, and d3; a total degree of polymerization may be in a range of about 1 to about 100,000; and the polyurethane elastomer may have a relative viscosity in a range of about 1.1 to about 3.0.

For example, the polyurethane elastomer may include a structural unit represented by Formulae 10a to 12a, and at least one structural units represented by Formulae 13d to 13f:

—(—$R_1$—O—)$_l$—  <Formula 10a>

—(—CO—$R_2$—NH—)$_m$—  <Formula 11a>

—(—OC—NH—$R_4$—NH—CO—)$_o$—  <Formula 12a>

—(—OOC—$R_3$—COO—)$_{n1}$—  <Formula 13d>

—(—OOC—$R_3$—CO—)$_{n2}$—  <Formula 13e>

—(—OC—$R_3$—CO—)$_{n3}$—  <Formula 13f>

In Formulae 10a to 12a and Formulae 13d to 13f, $R_1$, $R_2$, $R_3$, and $R_4$ may be the same as those in Formulae 10 to 12 and Formulae 13a to 13c; l, m, o, n1, n2, and n3 indicate repeating units, and n=n1+n2+n3, wherein when n is 1, l is from 2 to 200, m is from 2 to 50, and o is from 0.05 to 5; and a total degree of polymerization may be in a range of about 1 to about 10,000, and the polyurethane elastomer may have a relative viscosity in a range of about 1.1 to about 3.0.

In some embodiments, when n is 1, l is from 10 to 100, m is from 5 to 30, and o is from 0.1 to 1; and a total degree of polymerization may be in a range of about 1 to about 10,000, and the polyurethane elastomer may have a relative viscosity in a range of about 1.1 to about 3.0.

The structural unit of Formula 10 may be a structural unit from a polyol compound, the structural unit of Formula 11 may be a structural unit from an amide group-including compound, the structural unit of Formula 12 may be a structural unit from a diisocyanate compound, and the structural units of Formulae 13a to 13c may each be a structural unit from a polybasic acid compound.

For example, to provide further improved physical characteristics, the polyurethane elastomer may include about 10 wt % to about 80 wt % of a structural unit from the amide group-including compound, about 15 wt % to about 80 wt % of a structural unit from the polyol compound, about 1 wt % to about 10 wt % of a structural unit from the polybasic acid compound, and about 1 wt % to about 5 wt % of a structural unit from the diisocyanate compound, based on a total weight of structural units of the polyurethane elastomer.

When the amount of the structural unit from the amide group-including compound is in the range of about 10 wt % to about 80 wt %, the polyurethane elastomer may include a polyamide block that may provide improved physical characteristics compared to a control elastomer. When the amount of the structural unit from the polyol compound is in the range of about 15 wt % to about 80 wt %, the polyurethane elastomer may include a soft segment block that may provide improved physical characteristics compared to a control elastomer. When the amounts of the structural unit from the amide group-including compound and the amount of the structural unit from the polyol compound are within these ranges, a thermoplastic resin composition including the polyurethane elastomer and polylactic acid may have further improved physical characteristics, including improved impact strength compared, for instance, to a comparative resin as set forth in the Examples. When the amount of the structural unit from the polybasic acid compound is in the range of about 1 wt % to about 10 wt %, a thermoplastic resin composition including the polyurethane elastomer and polylactic acid may have further improved physical characteristics, including improved impact strength compared, for instance, to a comparative resin as set forth in the Examples. When the amount of the structural unit from the diisocyanate compound is in the range of about 0.5 wt % to about 5 wt %, the polyurethane elastomer may have further improved characteristics, including an appropriate viscosity facilitating mixing with polylactic acid compared to a control elastomer.

For example, the amount of the structural unit from the amide group-including compound may be in a range of about 26 wt % to about 78 wt %, and in some embodiments, about 30 wt % to about 50 wt %, based on a total weight of the structural units of the polyurethane elastomer.

For example, the amount of the structural unit from the polyol compound may be in a range of about 20 wt % to about 70 wt %, and in some embodiments, about 30 wt % to about 60 wt %, based on a total weight of the structural units of the polyurethane elastomer.

For example, the amount of the structural unit from the polybasic acid compound may be in a range of about 2 wt % to about 10 wt %, and in some embodiments, about 3 wt % to about 9 wt %, based on a total weight of the structural units of the polyurethane elastomer.

For example, the amount of the structural unit from the diisocyanate compound may be in a range of about 0.5 wt % to about 4 wt %, and in some embodiments, about 0.5 wt % to about 3 wt %, and in some other embodiments, about 0.5 wt % to about 2 wt %, based on a total weight of the structural units of the polyurethane elastomer.

In some embodiments, the polyurethane elastomer may comprise a polymer having Formula 14 or 15:

The polyurethane elastomer may have a number average molecular weight (Mn) of about 2,000 Daltons to about 50,000 Daltons, and in some embodiments, about 5,000 Daltons to about 50,000 Daltons. As a result of gel permeation chromatography (GPC) analysis, a number-average molecular weight of the polyurethane elastomer can be determined. The GPC analysis can be performed using PMMA (polymethylmethacrylate as a standard and HFIP (1,1,1,3,3,3-hexafluoro-2-isopropanol) as a solvent.

The polyurethane elastomer may have a relative viscosity of about 1.1 or greater as measured as a ratio of a viscosity of 0.05 wt % of the polyurethane elastomer dissolved in meta cresole to a viscosity of meta cresol solvent measured by using a Ubbelohde-Viscosimeter Type 50120 Capillary-No. II. For example, the polyurethane elastomer may have a relative viscosity of about 1.1 to about 3.0, and in some embodiments, about 1.2 to about 3.0, and in some embodiments, about 1.2 to about 2.5, and in some other embodi- <Formula 14>
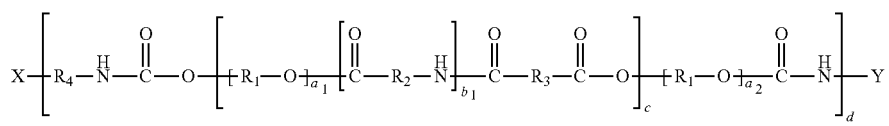

<Formula 15>
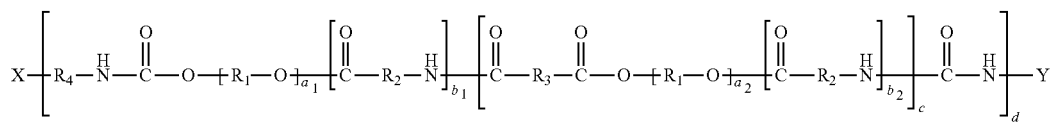

In Formulae 14 and 15: $R_1$ may be a C2-C5 alkylene group; $R_2$, $R_3$, and $R_4$ may be each independently a C2-C10 alkylene group; X and Y may be each independently a linking group, a hydrogen, —N=C=O, —$R_4$—N=C=O, —NH—COOH, or —$R_4$—NH—COOH, wherein X are Y may be linked to each other to form a ring; a1 and a2 may be each independently from 2 to 200; b1 and b2 may be each independently from 2 to 50; c may be from 1 to 50; and d may be from 1 to 10.

For example, the polyurethane elastomer may comprise a polymer having Formula 16 or 17:

ments, about 1.5 to about 2.2. When the polyurethane elastomer has a relative viscosity within these ranges, it may form a thermoplastic resin composition with improved physical characteristics by being mixed with a polylactic acid compared, for instance, to a comparative resin as set forth in the Examples.

The polyurethane elastomer may be a polymerization product of a polyurethane-forming composition including a polyamide prepolymer and a diisocyanate compound, and the polyamide prepolymer may be a polymerization product of a polyamide prepolymer-forming composition including <Formula 16>
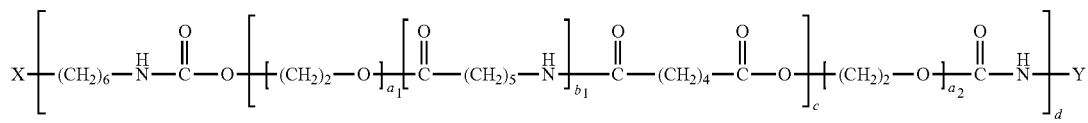

<Formula 17>
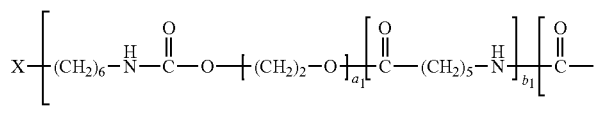

In Formulae 16 and 17, X and Y may be each independently a linking group, a hydrogen, —N=C=O, —$R_4$—N=C=O, —NH—COOH, or —$(CH_2)_6$—NH—COOH; a1 and a2 may be each independently from 2 to 200; b1 and b2 may be each independently from 2 to 50; c may be from 1 to 50; and d may be from 1 to 10.

an amide group-including compound, a polyol compound, and a polybasic acid compound. The polyurethane elastomer may be a polymerization product of a diisocyanate compound and a polyamide prepolymer that is a polymerization product of an amide group-including compound, a polyol compound, and a polybasic acid compound. The molecular weight of the pre-polymer may be increased with introduction of a urethane structural unit thereinto by addition of diisocyanate into the polyamide prepolymer, thereby forming the polyurethane elastomer. The polyurethane elastomer may comprise a novel block copolymer including both a nylon-based polyamide block and a polyurethane block.

The polyamide prepolymer may substantially be a nylon-based prepolymer. For example, the polyamide prepolymer may include a structural unit represented by Formulae 10 and 11, and at least one selected from structural units represented by Formulae 13a to 13c:

—(—R$_1$—O—)—  <Formula 10>

—(—CO—R$_2$—NH—)—  <Formula 11>

—(—OOC—R$_3$—COO—)—  <Formula 13a>

—(—OOC—R$_3$—CO—)—  <Formula 13b>

—(—OC—R$_3$—CO—)—  <Formula 13c>

In Formulae 10, 11, and 13a to 13c: $R_1$ and $R_2$ may be each independently a C2-C10 linear or branched alkylene group; and $R_3$ may be a covalent bond, a C1-C20 linear or branched alkylene group that is unsubstituted or substituted with a C1-C10 alkyl group or a C6-C20 aryl group; a C6-C20 arylene group or a C2-C20 heteroarylene group that is unsubstituted or substituted with a halogen or a C1-C10 linear or branched alkyl group; or a C2-C20 cycloalkylene group that is unsubstituted or substituted with a C1-C10 alkyl group, a C6-C20 aryl group, a C6-C10 cycloalkyl group, a C2-C10 alkenyl group, or a C2-C10 alkynyl group, wherein a mole fraction a of the structural unit represented by Formula 10 (i.e., the fraction or percent of the moles of a structural unit that is present in the total moles of the polyurethane elastomer), a mole fraction b of the structural unit represented by Formula 11, a mole fraction c of the structural formula of Formula 12, and mole fractions d1, d2, and d3 of the structural units represented by Formulae 13a to 13c, respectively, satisfy the following relationship: a+b+c+d=1 and d=d1+d2+d3, where 0<a<1, 0<b<1, 0<c<1, 0<d<1, 0≤d1<1, 0≤d2<1, and 0≤d3<1; a total degree of polymerization may be in a range of about 1 to about 100,000; and a relative viscosity of polyamide prepolymer may be in a range of about 1.05 and to about 2.0, and in some embodiments in a range of about 1.1 to about 3.0.

For example, the polyamide prepolymer may include a structural unit represented by Formulae 10a to 11a; and at least one selected from structural units represented by Formulae 13d to 13f:

—(—R$_1$—O—)$_l$—  <Formula 10a>

—(—CO—R$_2$—NH—)$_m$—  <Formula 11a>

—(—OOC—R$_3$—COO—)$_{n1}$—  <Formula 13d>

—(—OOC—R$_3$—CO—)$_{n2}$—  <Formula 13e>

—(—OC—R$_3$—CO—)$_{n3}$—  <Formula 13f>

In Formulae 10a, 11a, 13d, 13e, and 13f, $R_1$, $R_2$, and $R_3$ may be the same as those in Formulae 10 to 12 and Formula 13a to 13c; l, m, n1, n2, and n3 indicate repeating unit, and n=n1+n2+n3, wherein when n is 1, l is from 2 to 200, and m is from 2 to 50; A total degree of polymerization degree may be in a range of about 1 to about 100,000, and a relative viscosity of the polyamide prepolymer may be in a range of about 1.1 to about 3.0.

For example, when n is 1, l may be from 10 to 100, m may be from 5 to 30 a total degree of polymerization may be in a range of about 1 to about 10,000, and a relative viscosity of the polyamide prepolymer may be in a range of about 1.1 to about 3.0.

In some embodiments, the polyamide prepolymer may include a polymer represented by Formula 18 or 19:

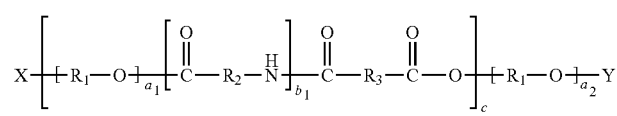
<Formula 18>

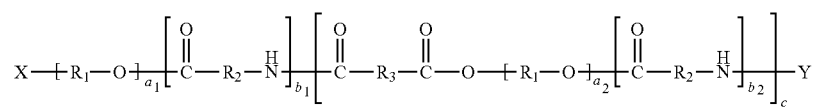
<Formula 19>

In Formulae 18 and 19, $R_1$ may be a C2-C5 alkylene group; $R_2$ and $R_3$ may be each independently a C2-C10 alkylene group; X and Y may be each independently a linking group, a hydrogen, or —OH; a1 and a2 may be each independently from 10 to 100; b1 and b2 may be each independently from 2 to 10; c may be from 1 to 100. In some other embodiments, the polyamide prepolymer may include a polymer represented by Formula 20 or 21:

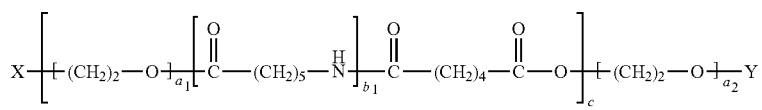
<Formula 20>

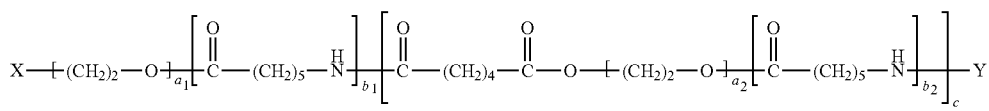
<Formula 21>

In Formulae 20 and 21, $R_1$ may be a C2-C5 alkylene group; $R_2$ and $R_3$ may be each independently a C2-C10 alkylene group; X and Y may be each independently a linking group, a hydrogen, or —OH a1 and a2 may be each independently from 2 to 200; b1 and b2 may be each independently from 2 to 50; c may be from 1 to 50.

A novel polyurethane elastomer having the characteristics of both polyamide and polyurethane may be obtained by polymerization of a polyamide prepolymer and a diisocyanate compound as described above.

According to another aspect of the present disclosure, a thermoplastic resin composition includes any of the polyurethane elastomers according to the above-described embodiments. For example, the thermoplastic resin composition may include a polyurethane elastomer as described above alone or together with another thermoplastic resin. For example, the polyurethane elastomer may further include polycarbonate resin, acrylonitrile butadiene styrene (ABS) resin, or polypropylene resin, but embodiments are not limited thereto. Any suitable resin available in the art may be used.

For example, the thermoplastic resin composition may include a polyurethane elastomer according to any of the above-described embodiments, and an aliphatic polyester. For example, the thermoplastic resin composition may include about 50 parts to about 98 parts by weight of an aliphatic polyester, and about 2 parts to about 50 parts by weight of the polyurethane elastomer, based on 100 parts by weight of a total weight of the thermoplastic resin composition. For example, the thermoplastic resin composition may include about 50 parts to about 90 parts by weight of an aliphatic polyester, and about 10 parts to about 50 parts by weight of the polyurethane elastomer, based on 100 parts by weight of a total weight of the thermoplastic resin composition. In some embodiments, the thermoplastic resin composition may include about 55 parts to about 85 parts by weight of an aliphatic polyester, and about 15 parts to about 45 parts by weight of the polyurethane elastomer, based on 100 parts by weight of a total weight of the thermoplastic resin composition. In some embodiments, the thermoplastic resin composition may include about 60 parts to about 80 parts by weight of an aliphatic polyester, and about 20 parts to about 40 parts by weight of the polyurethane elastomer, based on 100 parts by weight of a total weight of the thermoplastic resin composition. In some other embodiments, the thermoplastic resin composition may include about 65 parts to about 75 parts by weight of an aliphatic polyester, and about 25 parts to about 35 parts by weight of the polyurethane elastomer, based on 100 parts by weight of a total weight of the thermoplastic resin composition. When a thermoplastic resin composition is in these composition ranges, the thermoplastic resin composition may have further improved characteristics compared, for instance, to a comparative resin as set forth in the Examples.

For example, the aliphatic polyester in a thermoplastic resin composition according to the above described embodiments may be an aliphatic polyester obtained by condensation polymerization of aliphatic diol and, for example, aliphatic dicarboxylic acid or a functional derivative thereof as a main component, an aliphatic polyester obtained by condensation polymerization of aliphatic diol and aliphatic oxycarboxylic acid as a main component, an aliphatic polyester obtained by condensation polymerization of aliphatic diol and a caprolactone compound such as a caprolactone, as a main component, or may be polylactic acid. However, examples of the aliphatic polyester are not limited thereto, and any aliphatic polyester available in the art may be used. For example, the aliphatic polyester may be a biodegradable polymer, for example, polylactic acid.

The polylactic acid may be an aliphatic polyester including a repeating unit represented by Formula 22.

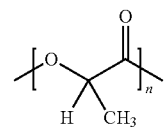
<Formula 22>

For example, the polylactic acid may have a weight average molecular weight of about 10,000 Daltons to about 500,000 Daltons, and in some embodiments, about 100,000 Daltons to about 300,000 Daltons. When the polylactic acid has a weight average molecular weight of less than 10,000 Daltons, the thermoplastic resin composition may have deteriorated physical characteristics. When the polylactic acid has a weight average molecular weight of larger than 500,000 Daltons, it may be difficult to process the polymer. As a result of gel permeation chromatography (GPC) analysis, a weight-average molecular weight of the polu-L-lactic acid (PLLA) can be determined. The GPC analysis can be performed using polystyrene as a standard and tetrahydrofuran as a solvent.

The thermoplastic resin composition may be in a liquid or solid state. The thermoplastic resin composition may be a composition before molding into a final product or may be a final molded article via molding, a film, or textile. These molded article, film, and textile may be formed in any shape by appropriate conventional methods used in the art.

The thermoplastic resin composition may further include an additive that is commonly used in conventional resin compositions. Non-limiting examples of the additive are a filler, a terminal blocking agent, a metal deactivator, an antioxidant, a thermal stabilizer, a UV absorber, a lubricant, a tackifier, a plasticizer, a crosslinking agent, a viscosity adjusting agent, an antistatic agent, a flavoring agent, a dispersing agent, and a polymerization inhibitor. These additives may be added within a range not deteriorating physical characteristics of the thermoplastic resin composition.

For example, the thermoplastic resin composition may include a filler. For example, the filler may be an inorganic filler such as talc, wollastonite, mica, clay, montmorillonite, smectite, kaolin, zeolite (aluminosilicate), or an anhydrous amorphous aluminum silicate obtained by acidic and thermal treatment of zeolite. When the thermoplastic resin composition includes a filler, the amount of the filler may be in a range of about 1 wt % to about 20 wt % based on the total weight of the thermoplastic resin composition to maintain the impact resistance of a final molded article.

For example, the thermoplastic resin composition may include a carbodiimide compound, such as a polycarbodiimide compound or a monocarbodiimide compound. These carbodiimide compounds may react with some or all of terminal carboxyl groups of polylactic acid resin, blocking side reactions such as hydrolysis, thus improving the water resistance of a molded article including the thermoplastic resin composition. Thus, a molded article including the thermoplastic resin composition may have improved durability under high-temperature and high-humidity conditions as compared to a control molded article.

Examples of suitable polycarbodiimide compounds include poly(4,4'-diphenylmethane carbodiimide), poly(4,4'-dicyclohexylmethane carbodiimide), poly(1,3,5-tridiisopropylbenzene)polycarbodiimide, poly(1,3,5-tridiisopropylbenzene, and 1,5-diisopropylbenzene)polycarbodiimide. For example, the monocarbodiimide compound may be N,N'-di-2,6-diisopropylphenylcarbodiimide.

The amount of the carbodiimide compound may be in a range of about 0.1 wt % to about 3 wt % based on a total weight of the thermoplastic resin composition. When the amount of the carbodiimide compound is less than 0.1 wt %, the durability improvement in a molded article may be insignificant. When the amount of the carbodiimide compound is larger than 3 wt %, a molded article may have weaken mechanical strength.

The thermoplastic resin composition may include a stabilizer or a colorant to stabilize the molecular weight or color of the composition article during molding. Non-limiting examples of the stabilizer are a phosphorus stabilizer, a hindered phenolic stabilizer, a UV absorber, a thermal stability, and an antistatic agent.

For example, the phosphorus stabilizer may be phosphorous acid, phosphoric acid, phosphonic acid, and esters thereof (a phosphite compound, a phosphate compound, a phosphonite compound, a phosphonate compound, or the like), and a third-grade phosphine.

For example, a stabilizer including a phosphonite compound as a main component may be Sandostab P-EPQ (available from Clariant), Irgafos P-EPQ (available from CIBA SPECIALTY CHEMICALS), or the like.

For example, a stabilizer including a phosphite compound as a main compound may be PEP-8 (available from ASAHI DENKA KOGYO KK), JPP681S (available from Tohoku Chemical Industry Incorporated Co.), PEP-24G (available from ASAHI DENKA KOGYO KK), Alkanox P-24 (available from Great Lakes), Ultranox P626 (available from GE Specialty Chemicals), Doverphos S-9432 (available from Dover Chemical), Irgaofos126, 126 FF (available from CIBA SPECIALTY CHEMICALS), PEP-36 (available from ASAHI DENKA KOGYO KK), PEP-45 (available from ASAHI DENKA KOGYO KK), or Doverphos S-9228 (available from Dover Chemical).

For example, the hindered phenolic stabilizer (antioxidant) may be a general compound used in conventional resins. For example, the hindered phenolic stabilizer may be 3,9-bis[2-{3-(3-t-butyl-4-hydroxy-5-methylphenyl)propionyloxy}-1,1-dimethylethyl]-2,4,8,10-tetraoxaspiro[5,5]undecane, but is not limited thereto. Any hindered phenolic compound available in the art as an oxidation stability for a thermoplastic resin composition may be used.

The amounts of the phosphorus stabilizer and the hindered phenolic antioxidant may be each in a range of about 0.005 wt % to about 1 wt % based on a total weight of the thermoplastic resin composition.

For example, the thermoplastic resin composition may include a UV absorber. The inclusion of a UV absorber in the thermoplastic resin composition may suppress deterioration in weather resistance of a molded article caused by a rubber component or a flame retardant. Examples of the UV absorber are benzophenone-based UV absorbers; benzotriazole-based UV absorbers; hydroxyphenyltriazine-based UV absorbers; cyclic iminoester-based UV absorbers; and cyanoacrylate-based UV absorbers. The amount of the UV absorber may be in a range of about 0.01 wt % to about 2 wt % based on a total weight of the thermoplastic resin composition.

For example, the thermoplastic resin composition may include a colorant such as a dye or a pigment to provide various colors to a molded article.

For example, the thermoplastic resin composition may include an antistatic agent to provide an antistatic characteristic to a molded article.

The thermoplastic resin composition may further include, in addition to the above-listed additives, other thermoplastic resin, a fluidity modifier, an antimicrobial agent, a dispersing agent such as a liquid paraffin, a photocatalytic contaminant removing agent, an infra-red (IR) absorbent, and a photochromic agent.

For example, the thermoplastic resin composition may have an impact strength of about 40 J/m or higher, and in some embodiments, in a range of about 40 J/m to about 900 J/m, and in some other embodiments, in a range of about 70 J/m to about 900 J/m, and in still other embodiments, in a range of about 100 J/m to about 900 J/m, and in yet other embodiments, in a range of about 200 J/m to about 800 J/m. When the thermoplastic resin composition has as impact strength of 40 J/m or greater, a molded article made therefrom may have improved durability compared, for instance, to a comparative resin as set forth in the Examples.

According to another aspect of the present disclosure, there is provided a molded article made of a thermoplastic resin composition according to any of the above-described embodiments.

The thermoplastic resin composition may be obtained by melt-compounding components thereof by using any of a variety of extruders, a banbury mixer, a kneader, a continuous kneader, or a roll. In the melt-compounding of the components, the components may be added simultaneously at one time or may be added in installments. The resulting thermoplastic resin composition may be formed into a molded article by using a known molding process, for example, extrusion molding, press molding, calendar molding, T-die extrusion molding, hollow profile sheet extrusion molding, foam sheet extrusion molding, inflation molding, lamination molding, vacuum molding, profile extrusion molding, or a combination of these methods.

When a mixing-kneading extruder or a mixer-kneader such as a banbury mixer is connected to a molder such as a calendar molder, T-die extrusion molder, or inflation moldering, a molded article may be formed at the same time with the preparation of the thermoplastic resin composition, without earlier preparation of the thermoplastic resin composition.

A molded article formed using the thermoplastic resin composition may be used for various uses. For example, the molded article may be used for medical uses, for example, as a vascular graft, a cell carrier, a drug carrier, or a gene carrier. The molded article may also be used as interior and exterior material for various general products, for example, for home appliances, communications devices, and industrial equipments. The molded article may also be used in the field of products for general uses, including cases, such as a relay case, a wafer case, a reticle case, and a mask case; trays, including a liquid crystal tray, a chip tray, a hard disk tray, a CCD tray, an IC tray, an organic EL tray, an optical pickup tray, and a LED tray; carriers such as an IC carrier; a polarizing film, a light guide plate, protective films for various lenses, mat sheets for use in cutting polarizing films, sheets used for such as partition plates in a clean room, or films; antistatic bags for vending machine inner members, liquid crystal panels, hard disks, or plasma panels; plastic corrugated fiberboards, carrier cases for liquid crystal panels, liquid crystal cells, or plasma panels; and other carrier related members for various parts.

According to another aspect of the present disclosure, a method of preparing a polyurethane elastomer according to any of the above-described embodiments includes: polymerizing a polyamide-forming composition containing an amide group-including compound, a polyol compound, and a polybasic acid compound to prepare a polyurethane-forming composition including a polyamide prepolymer to; and polymerizing the polyurethane-forming composition including the polyamide prepolymer and a diisocyanate compound to obtain the polyurethane elastomer.

The method may further comprise polymerizing the polyurethane elastomer with an aliphatic polyester to form a thermoplastic resin composition.

Also provided is a method of making a molded article, the method comprising forming a thermoplastic resin composition into a desired shape.

A polyurethane elastomer according to any of the above-described embodiments having a large molecular weight and a novel structure may be prepared according to the method by reacting a polyamide prepolymer obtained as described above with a compound having a diisocyanate group.

The polyamide-forming composition may further include any ingredient known for use in polymerization, such as a catalyst, in addition to an amide group-including compound, a polyol compound, and a polybasic acid compound.

The preparing of the polyamide prepolymer may be performed at a temperature of about 220° C. to about 260° C. for about 1 to 10 hours. However, the conditions for preparing the polyamide prepolymer are not limited thereto, and may be appropriately varied depending on required physical characteristics. For example, the preparing of the polyamide prepolymer may be performed for about 1 to 5 hours.

In some embodiments of the polyurethane elastomer preparation method, the polyamide prepolymer may have a relative viscosity of about 1.05 to about 2.0, and in some other embodiments, about 1.1 to about 1.6. When a polyamide prepolymer having a relative viscosity within these ranges is used, a polyurethane elastomer with improved physical characteristics may be prepared.

In some embodiments of the polyurethane elastomer preparation method, the obtaining of the polyurethane elastomer from a compound having a diisocyanate group and the polyamide prepolymer (i.e., the polymerizing of a polyurethane-forming composition including the polyamide prepolymer and a diisocyanate compound to obtain the polyurethane elastomer) may be performed at a temperature of about 220° C. to about 250° C. The obtaining of the polyurethane elastomer may be performed for about 2 hours or less, and in some embodiments, for 1 hour or less, and in some other embodiments, about 30 minutes or less.

The amide group-including compound, the polyol compound, the polybasic acid compound, and the diisocyanate compound used in the polyurethane elastomer preparation method may be the same as described above in conjunction with the polyurethane elastomers according to the above-described.

In some embodiments of the polyurethane elastomer preparation method, about 10 parts to about 80 parts by weight of an amide group-including compound, about 18 parts to about 80 parts by weight of a polyol compound, about 1 part to about 10 parts by weight of a polybasic acid compound, and about 0.5 part to about 5 parts by weight of a diisocyanate compound by weight, each based on 100 parts by weight of a total weight of the starting materials including the amide group-including compound, the polyol compound, the polybasic acid compound and the diisocyanate compound, may be used.

For example, about 26 parts to about 78 parts by weight, and in some embodiments, about 30 parts to about 50 parts by weight of an amide group-including compound may be used based on 100 parts by weight of the starting materials.

For example, about 20 parts to about 70 parts by weight, and in some embodiments, about 30 parts to about 60 parts by weight of a polyol compound may be used based on 100 parts by weight of the starting materials.

For example, about 2 parts to about 10 parts by weight, and in some embodiments, about 3 parts to about 9 parts by weight of a polybasic acid compound may be used based on 100 parts by weight of the starting materials.

For example, about 0.5 part to about 4 parts by weight, and in some embodiments, about 0.5 part to about 3 parts by weight, and in some other embodiments, about 0.5 part to about 2 parts by weight of a diisocyanate compound may be used based on 100 parts by weight of the starting materials.

One or more embodiments of the present disclosure will now be described in detail with reference to the following examples. However, these examples are only for illustrative purposes and are not intended to limit the scope of the one or more embodiments of the present disclosure.

Preparation of Polyurethane Elastomer

Example 1

40 g of caprolactam (CLM) as an amide group-including compound, 6.57 g of adipic acid (AA) as a polybasic acid compound, 45 g of polyethylene glycol (PEG 1000, Mn=1000) as a polyol compound, 0.5 g of phosphoric acid, and 5 g of distilled water were put into a 200-mL glass reactor equipped with a stirrer, a heater, a condenser, and an evacuator under a nitrogen atmosphere, and stirred at about 200 rpm while increasing the temperature to about 220° C. 5 g of distilled water was further added while increasing the temperature to about 240° C. for about 2 hours. After maintaining the temperature at 240° C. for about 2 hours, the pressure was reduced to about 1 Torr for 3 hours to remove caprolactam remaining unreacted and water generated from condensation, thereby obtaining a polyamide prepolymer.

Subsequently, 1 g of hexamethylene diisocyanate as a diisocyanate compound was put into the reactor and reacted for about 10 minutes, thereby obtaining a polyurethane elastomer after termination of the reaction.

The polyurethane elastomer had a structure in which a first hard segment block from the amide group-including compound (caprolactam) and a second hard segment block from the diisocyanate compound were linked by a soft segment block from the polyol compound (PEG 1000), wherein these blocks were linked together by a structural unit from the polybasic acid compound (adipic acid).

Examples 2 to 13

Polyurethane elastomers were prepared by polymerization in the same manner as in Example 1, except that types of compounds and amounts thereof were varied as in Table 1.

Comparative Example 1: No Addition of Diisocyanate Compound 50 g of caprolactam (CLM) as an amide group-including compound, 3.65 g of adipic acid (AA) as a polybasic acid compound, 33 g of polyethylene glycol (PEG 1000, Mn=1000) as a polyol compound, 0.5 g of phosphoric acid, and 5 g of distilled water were put into a 200-mL glass reactor equipped with a stirrer, a heater, a condenser, and an evacuator under a nitrogen atmosphere, and stirred at about 200 rpm while increasing the temperature to about 220° C. 5 g of distilled water was further added while increasing the temperature to about 240° C. for about 2 hours. After maintaining the temperature at 240° C. for about 2 hours, the pressure was reduced to about 1 Torr for 3 hours and 10 minutes to remove caprolactam remaining unreacted and water generated from condensation, thereby obtaining a polyamide elastomer.

Comparative Examples 2 to 4

Polyamide elastomers were prepared by polymerization in the same manner as in Comparative Example 1, except that types of compounds and amounts thereof were varied as in Table 1.

Comparative Example 5: No Addition of Polybasic Acid Compound and Caprolactam 60 g of polyethylene glycol (PEG 20500, Mn=2050) as a polyol compound was put into a 200-mL glass reactor equipped with a stirrer, a heater, a condenser, and an evacuator under a nitrogen atmosphere, and stirred at about 200 rpm while increasing the temperature to about 100° C. After 5 g of hexamethylene diisocyanate as a diisocyanate compound was slowly added for about 5 minutes, the temperature was increased to about 200° C. for 20 minutes for polymerization. 1 g of hexamethylene diisocyanate as a diisocyanate compound was further added when the temperature reached 200° C., followed by a temperature increase to about 230° C. at which the reaction was terminated, thereby obtaining a elastomer.

TABLE 1 [1]

| Example | Amide group-including compound | Polyol compound | Polybasic acid compound | Diisocyanate compound |
|---|---|---|---|---|
| Example 1 | CLM 40 g | PEG 1000 45 g | AA 6.57 g | HMDI 1 g |
| Example 2 | CLM 50 g | PEG 1000 33 g | AA 2.43 g | HMDI 2 g |
| Example 3 | CLM 50 g | PEG 1000 33 g | AA 3.24 g | HMDI 1 g |
| Example 4 | CLM 30 g | PEG 1000 55 g | AA 8.03 g | HMDI 2 g |
| Example 5 | CLM 40 g | PEG 2050 45 g | AA 3.20 g | HMDI 1 g |
| Example 6 | CLM 50 g | PEG 2050 55 g | AA 3.20 g | HMDI 2 g |
| Example 7 | CLM 40 g | PEG 3350 67 g | AA 1.96 g | HMDI 1 g |
| Example 8 | CLM 30 g | PTMEG 1000 45 g | AA 5.60 g | HMDI 1 g |
| Example 9 | CLM 50 g | PPG 1000 33 g | AA 4.87 g | HMDI 2 g |
| Example 10 | CLM 50 g | PEG 1000 33 g | TPA 3.32 g | HMDI 2 g |
| Example 11 | CLM 50 g | PEG 1000 33 g | AA 2.43 g | MBPI 1.5 g |
| Example 12 | CLM 50 g | PEG 1000 33 g | AA 2.43 g | TDI 1.6 g |
| Example 13 | CLM 50 g | PEG 200 10 g | AA 3.65 g | HMDI 3 g |
| Comparative Example 1 | CLM 50 g | PEG 1000 33 g | AA 4.87 g | — |
| Comparative Example 2 | CLM 40 g | PEG 2050 45 g | AA 3.20 g | — |
| Comparative Example 3 | CLM 40 g | PEG 3350 45 g | AA 1.96 g | — |
| Comparative Example 4 | CLM 40 g | PTMEG 1000 45 g | AA 6.57 g | — |
| Comparative Example 5 | — | PEG 2050 60 g | — | HMDI 6 g |

[1] Abbreviations of compounds in Table 1 are defined as follows: CLM: caprolactam, AA: adipic acid, TPA: terephthalic acid, HMDI: hexamethylene diisocyanate, TDI: toluene diisocyanate, MBPI: methylene bisphenyl isocyanate, PEG 1000: polyethylene glycol Mn = 1000, PPG 1000: polypropylene glycol Mn = 1000, PEG 2050: polyethylene glycol Mn = 2050, PEG 3350: polyethyene glycol Mn = 3350, PEG 200: polyethylene glycol Mn = 200, PTMEG 1000: polytetramethylene glycol Mn = 1000

Preparation of Thermoplastic Resin Composition

Example 14: Preparation of Thermoplastic Resin Composition Including Polyurethane Elastomer and Polylactic Acid The polyurethane elastomer of Example 1 and polylactic acid (PLLA (poly-L-lactic acid), available from Nature-Works, Product code: 4032D) were mixed in a weight ratio as shown in Table 2 to prepare a thermoplastic resin composition.

The thermoplastic resin composition was molded by extrusion molding into pellets, which were then subjected to injection molding to prepare specimen for impact strength test. The extrusion molding was performed using a Thermo Scientific Process 11 Twin-Screw Extruder at a screw speed of about 60 rpm and a maximum barrel temperature of about 240° C., followed by cooling molded articles in a water bath at room temperature to obtain pellets. The injection molding was performed using a Thermo Scientific HAAKE Minijet II at a temperature of about 100° C. for about 90 seconds to prepare specimen for impact strength test.

Examples 15 to 30

Thermoplastic resin compositions were prepared in the same manner as in Example 14, except that the polyurethane elastomers of Examples 2 to 13, instead of the polyurethane elastomer of Example 1, were used, respectively, and the barrel temperature and injection molding conditions (time) were varied as shown in Table 2.

Comparative Examples 6 to 10

Thermoplastic resin compositions were prepared in the same manner as in Example 14, except that the polyamide elastomers of Comparative Examples 1 to 5, instead of the polyurethane elastomer of Example 1, were used, respectively, and the barrel temperature and injection molding conditions were varied as shown in Table 2.

Comparative Example 11

A thermoplastic resin composition was prepared using only polylactic acid (PLLA, available from NatureWorks, Product code: 4032D).

TABLE 2

| Example | Elastomer Type | Elastomer Amount [wt %] | Amount of polylactic acid [wt %] | Barrel temperature [° C.] | Injection molding time [second] |
|---|---|---|---|---|---|
| Example 14 | Example 1 | 20 | 80 | 240 | 90 |
| Example 15 | Example 1 | 30 | 70 | 240 | 90 |
| Example 16 | Example 1 | 50 | 50 | 240 | 90 |
| Example 17 | Example 2 | 15 | 85 | 240 | 90 |
| Example 18 | Example 2 | 30 | 70 | 240 | 90 |
| Example 19 | Example 3 | 30 | 70 | 240 | 90 |
| Example 20 | Example 4 | 30 | 70 | 240 | 90 |
| Example 21 | Example 5 | 30 | 70 | 240 | 90 |
| Example 22 | Example 6 | 30 | 70 | 240 | 90 |
| Example 23 | Example 6 | 30 | 70 | 240 | 60 |
| Example 24 | Example 7 | 30 | 70 | 240 | 90 |
| Example 25 | Example 8 | 30 | 70 | 240 | 90 |
| Example 26 | Example 9 | 30 | 70 | 240 | 90 |
| Example 27 | Example 10 | 30 | 70 | 240 | 90 |
| Example 28 | Example 11 | 30 | 70 | 240 | 90 |
| Example 29 | Example 12 | 30 | 70 | 240 | 90 |
| Example 30 | Example 13 | 30 | 70 | 240 | 90 |
| Comparative Example 6 | Comparative Example 1 | 30 | 70 | 240 | 90 |
| Comparative Example 7 | Comparative Example 2 | 30 | 70 | 240 | 90 |
| Comparative Example 8 | Comparative Example 3 | 30 | 70 | 240 | 90 |
| Comparative Example 9 | Comparative Example 4 | 30 | 70 | 240 | 90 |
| Comparative Example 10 | Comparative Example 5 | 30 | 70 | 220 | 90 |
| Comparative Example 11 | — | | 100 | 220 | 90 |

Evaluation Example 1: Relative Viscosity

The viscosities of the thermoplastic elastomers of Examples 1 to 13 and Comparative Examples 1 to 5 were measured as a relative viscosity of a 0.05 wt % solution of each thermoplastic elastomer dissolved in meta cresol (m-cresol) with respect to the viscosity of m-cresol solvent itself. The results are shown in Table 3. The relative viscosity was calculated using Equation 1.

Relative viscosity=Viscosity of 0.05 wt % elastomer solution in m-cresol at 30° C./Viscosity of m-cresol solvent at 30° C.   Equation 1:

TABLE 3

| Example | Relative viscosity |
|---|---|
| Example 1 | 1.51 |
| Example 2 | 1.38 |
| Example 3 | 1.58 |
| Example 4 | 1.59 |
| Example 5 | 2.09 |
| Example 6 | 1.65 |
| Example 7 | 2.07 |
| Example 8 | 1.60 |
| Example 9 | 1.31 |
| Example 10 | 1.58 |
| Example 11 | 1.40 |
| Example 12 | 2.92 |
| Example 13 | 1.60 |
| Comparative Example 1 | 1.30 |
| Comparative Example 2 | 1.39 |
| Comparative Example 3 | 1.68 |
| Comparative Example 4 | 1.42 |
| Comparative Example 5 | 1.73 |

Referring to Table 3, the thermoplastic elastomers of Examples 1 to 13 were found to have a relative viscosity of about 1.30 or higher. The relative viscosity has a correlation with molecular weight. The larger the molecular weight, the higher the relative viscosity may become. When an elastomer has a relative viscosity of 1.1 or less, this may suppress an effect of impact strength increase. When an elastomer has a relative viscosity of 3.0 or higher, stirring may not be smooth due to a viscosity increase during polymerization.

Referring to Table 3, the polyurethane elastomer of Example 1 was found to have a higher relative viscosity (i.e., molecular weight) than that of the polyamide elastomer of Comparative Example 1 that was prepared through reaction for the same reaction time, indicating that an elastomer having a large molecular weight may be prepared in short time using a method according to an embodiment of the present disclosure.

Evaluation Example 2: Impact Strength Measurement

The Izod impact strengths of the thermoplastic resin compositions of Examples 14 to 30 and Comparative Examples 6 to 11 were measured according to ASTM D256 by using an Izod impact tester (available from Toyoseik). The results are shown in Table 4.

TABLE 4

| Example | Impact strength [J/m] |
|---|---|
| Example 14 | 95 |
| Example 15 | 117 |
| Example 16 | 72 |
| Example 17 | 78 |
| Example 18 | 248 |
| Example 19 | 119 |
| Example 20 | 178 |
| Example 21 | 487 |
| Example 22 | 535 |
| Example 23 | 781 |
| Example 24 | 311 |
| Example 25 | 131 |
| Example 26 | 40 |
| Example 27 | 160 |
| Example 28 | 61 |
| Example 29 | 53 |
| Example 30 | 54 |
| Comparative Example 6 | 44 |
| Comparative Example 7 | 196 |
| Comparative Example 8 | 136 |
| Comparative Example 9 | 61 |
| Comparative Example 10 | 71 |
| Comparative Example 11 | 31 |

Referring to Table 4, the thermoplastic resin compositions of Examples 14 to 30 were found to have markedly higher impact strengths than the thermoplastic resin composition of Comparative Example 11 including polylactic acid alone, even than the thermoplastic resin composition of Comparative Example 10 including a conventional polyurethane elastomer, which is free of polyamide.

The thermoplastic resin compositions of Examples 14 to 18, 19, 20, 21, and 22 including polyurethane elastomers having a similar composition, except for including a urethane structure unit, to the thermoplastic resin compositions of Comparative Examples 6 to 9 including polyamide elastomers, were found to have markedly improved impact strengths compared to those of Comparative Examples 6 to 9.

As described above, according to the one or more of the above embodiments of the present disclosure, the physical characteristics such as impact resistance of a thermoelastic resin composition including polylactic acid may be markedly improved by being mixed with a novel polyurethane elastomer that includes both a structural unit from an amide group-including compound and a structural unit from a diisocyanate compound.

It should be understood that the exemplary embodiments described therein should be considered in a descriptive sense only and not for purposes of limitation. Descriptions of features or aspects within each embodiment should typically be considered as available for other similar features or aspects in other embodiments.

While one or more embodiments of the present disclosure have been described, it will be understood by those of ordinary skill in the art that various changes in form and details may be made therein without departing from the spirit and scope of the present disclosure as defined by the following claims.

It should be understood that the exemplary embodiments described herein should be considered in a descriptive sense only and not for purposes of limitation. Descriptions of features or aspects within each embodiment should typically be considered as available for other similar features or aspects in other embodiments.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A polyurethane elastomer comprising an amide compound, a polyol compound, a polybasic acid compound, and a diisocyanate compound,
    wherein the polyurethane elastomer comprises about 10 wt % to about 80 wt % of a structural unit comprising the amide compound, about 15 wt % to about 80 wt % of a structural unit comprising the polyol compound, about 1 wt % to about 10 wt % of a structural unit comprising the polybasic acid compound, and about 0.5 wt % to 5 wt % of a structural unit comprising the diisocyanate compound, based on the total weight of the polyurethane elastomer,
    wherein the polyurethane elastomer comprises a polymer of Formula 14:

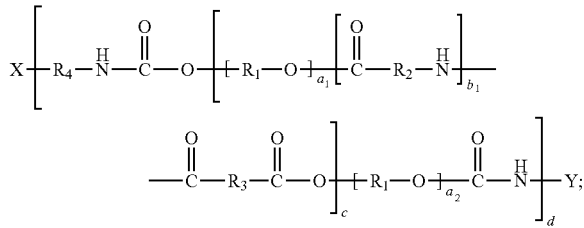

or

Formula 15

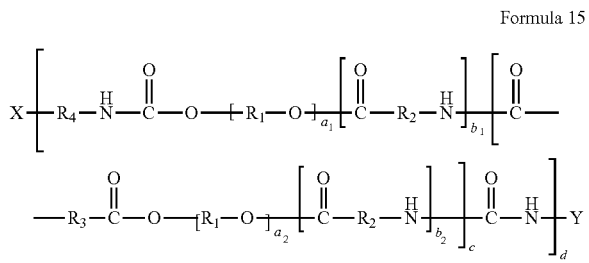

wherein $R_1$ is a $C_2$-$C_5$ alkylene group;
$R_2$, $R_3$, and $R_4$ are each independently a $C_2$-$C_{10}$ alkylene group;
X and Y are each independently a linking group, a hydrogen, —N=C=O, —$R_4$—N=C=O, —NH—COOH, or —$R_4$—NH—COOH, wherein X and Y can be linked to form a ring;
$a_1$ and $a_2$ are each independently integers from 2 to 200;
$b_1$ and $b_2$ are each independently integers from 2 to 50;
c is an integer from 1 to 50; and
d is an integer from 1 to 10.

2. The polyurethane elastomer of claim 1, wherein the polyurethane elastomer comprises a polymer represented by Formula 16:

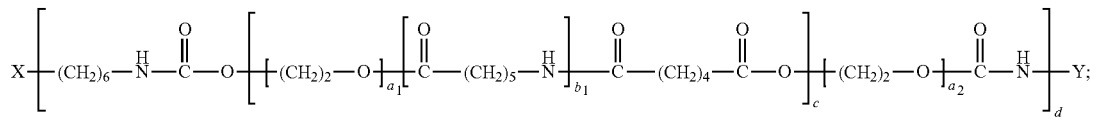

or

Formula 17

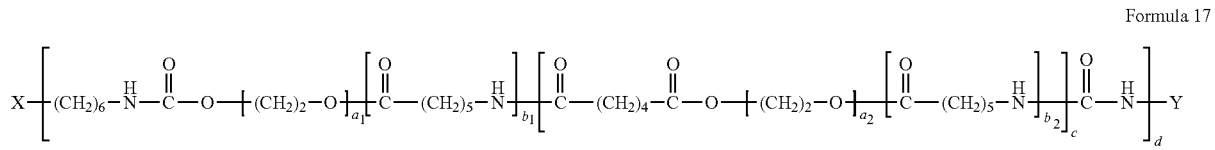

wherein
X and Y are each independently a linking group, a hydrogen, —N=C=O, —(CH$_2$)$_6$—N=C=O, —NH—COOH, or —(CH$_2$)$_6$—NH—COOH, wherein X and Y can be linked to each other to form a ring;
$a_1$ and $a_2$ are each independently integers from 2 to 200;
$b_1$ and $b_2$ are each independently integers from 2 to 50;
c is an integer from 1 to 50; and
d is an integer from 1 to 10.

3. The polyurethane elastomer of claim 1, wherein the polyurethane elastomer has a number average molecular weight (Mn) of about 2,000 to about 50,000.

4. The polyurethane elastomer of claim 1, wherein the polyurethane elastomer has a relative viscosity of about 1.1 or greater.

5. The polyurethane elastomer of claim 1, wherein the polyurethane elastomer is a polymerization product of a polyurethane-forming composition comprising a polyamide prepolymer and a diisocyanate compound, and wherein the polyamide prepolymer is a polymerization product of a polyamide prepolymer-forming composition comprising the amide compound, the polyol compound, and the polybasic acid compound.

6. A thermoplastic resin composition comprising:
about 50 parts to about 98 parts by weight of an aliphatic polyester; and
about 2 parts to about 50 parts by weight of a polyurethane elastomer, based on 100 parts by weight of the thermoplastic resin composition;
wherein the polyurethane elastomer comprises an amide compound, a polyol compound, a polybasic acid compound, and a diisocyanate compound,
wherein the polyurethane elastomer comprises about 10 wt % to about 80 wt % of a structural unit comprising the amide compound, about 15 wt % to about 80 wt % of a structural unit comprising the polyol compound, about 1 wt % to about 10 wt % of a structural unit comprising the polybasic acid compound, and about 0.5 wt % to 5 wt % of a structural unit comprising the diisocyanate compound, based on the total weight of the polyurethane elastomer,
wherein the polyurethane elastomer comprises a polymer of Formula 14:

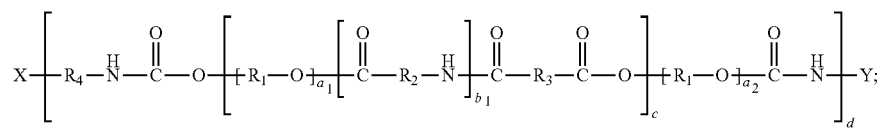

or

Formula 15:

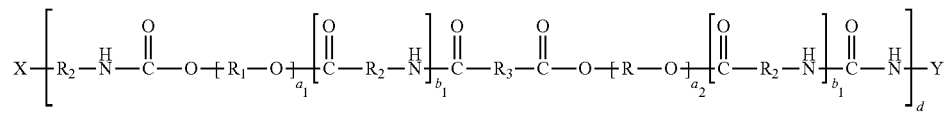

wherein R$_1$ is a C$_2$-C$_5$ alkylene group;
R$_2$, R$_3$, and R$_4$ are each independently a C$_2$-C$_{10}$ alkylene group;
X and Y are each independently a linking group, a hydrogen, —N=C=O, —R$_4$—N=C=O, —NH—COOH, or —R$_4$—NH—COOH, wherein X and Y can be linked to form a ring;
$a_1$ and $a_2$ are each independently integers from 2 to 200;
$b_1$ and $b_2$ are each independently integers from 2 to 50;
c is an integer from 1 to 50; and
d is an integer from 1 to 10.

7. The thermoplastic resin composition of claim 6, wherein the thermoplastic resin composition comprises about 60 parts to about 80 parts by weight of the aliphatic polyester, and about 20 parts to about 40 parts by weight of the polyurethane elastomer, based on 100 parts by weight of the thermoplastic resin composition.

8. The thermoplastic resin composition of claim 6, wherein the aliphatic polyester comprises polylactic acid.

9. The thermoplastic resin composition of claim 6, wherein the thermoplastic resin composition has an impact strength of about 40 J/m or greater.

10. A molded article comprising the thermoplastic resin composition of claim 6.

11. A method of preparing a polyurethane elastomer of claim 1, the method comprising:
  polymerizing a polyamide-forming composition comprising an amide compound, a polyol compound, and a polybasic acid compound to obtain a polyamide prepolymer; and
  polymerizing the polyamide prepolymer with a diisocyanate compound to obtain the polyurethane elastomer.

12. The method of claim 11, wherein the polyamide prepolymer is polymerized with the diisocyanate compound at a temperature of about 220° C. to about 250° C.

13. The method of claim 11, wherein the polyamide prepolymer is polymerized with the diisocyanate compound for about 2 hours or less.

14. A method of making a molded article, the method comprising forming the thermoplastic resin composition of claim 6 into a desired shape.

15. The polyurethane of claim 1, comprising about 0.5 wt % to 4 wt % of a structural unit comprising the diisocyanate compound.

16. The polyurethane of claim 1, comprising about 0.5 wt % to about 3 wt % of a structural unit comprising the diisocyanate compound.

* * * * *